United States Patent [19]

Kwong

[11] 4,239,497
[45] Dec. 16, 1980

[54] ADDITIVES FOR HYDROCARBON OILS

[75] Inventor: Gary W. Y. Kwong, Palatine, Ill.

[73] Assignee: UOP Inc., Des Plaines, Ill.

[21] Appl. No.: 92,385

[22] Filed: Nov. 8, 1979

[51] Int. Cl.$^3$ .......................... C10L 1/18; C10L 1/22
[52] U.S. Cl. .......................................... 44/72; 44/77;
252/403
[58] Field of Search .......................... 44/72, 77, 79, 62;
252/403

[56] References Cited

U.S. PATENT DOCUMENTS

| 3,031,504 | 4/1962 | Pollitzer | 44/72 |
| 3,189,652 | 6/1965 | Pollitzer | 44/72 |
| 3,457,053 | 7/1969 | Rosenwald | 44/72 |
| 3,686,315 | 8/1972 | Rosenwald | 44/72 |
| 3,901,666 | 8/1975 | Rosenwald | 44/72 |
| 3,929,655 | 12/1975 | Gattuso | 44/72 |
| 3,930,810 | 1/1976 | Gattuso | 44/72 |

*Primary Examiner*—Jacqueline V. Howard
*Attorney, Agent, or Firm*—James R. Hoatson, Jr.; Raymond H. Nelson; William H. Page, II

[57] ABSTRACT

An additive for inhibiting sedimentation and retarding degradation of hydrocarbon oils as evidenced by discoloration comprises the reaction product of a poly(oxyalkylene)amine with an epihalohydrin at a temperature from about 40° C. to about 150° C. in the presence of an inorganic base.

13 Claims, No Drawings

ADDITIVES FOR HYDROCARBON OILS

BACKGROUND OF THE INVENTION

Various types of petroleum-derived hydrocarbon oils undergo deterioration on storage or upon exposure to severe conditions. Thus fuel oils such as gasoline, diesel fuel, jet fuel, other aviation fuel, burner oil, furnace oil, kerosene, and naphtha, for example, and other oils such as lubricating oils, cutting oils, slushing oils, etc., undergo deterioration as evidenced by such changes as, for example, formation of sediment and discoloration.

Sediment formation is undesirable for various reasons. When formed in tanks storing hydrocarbon oils the settling of accumulated particulates requires periodic draining and cleaning of storage tanks, leading to temporary unavailability of storage capacity, substantial diversion of manpower, and waste disposal problems. Sediment formation in burner oil tends to plug strainers, burner tips, injectors, etc. In diesel fuel such sediment tends to form sludge and varnish in the engine. If the oil is used as a heat exchange medium, as for example with jet fuel, the sediment tends to plug heat exchanger coils. In gasoline the sediment may tend to deposit on sensitive parts in an internal combustion engine, such as carburetors, thereby decreasing the efficiency of combustion and causing increased fuel consumption.

It is apparent, therefore, that reduced sediment formation in hydrocarbon oils is desirable. One method of effecting such reduction would be to eliminate, to a substantial degree, those processes leading to particulate formation, such as oxidation. Another method would be to prevent agglomeration and/or settling of the formed particulate matter by effectively maintaining the fine particulates in a well dispersed state, for when the particulates are so dispersed the aforementioned difficulties associated with sediment formation either do not occur or are of substantially lessened severity.

Discoloration of hydrocarbon oils is undesirable because it is an indication that degradation has occurred or is occurring, hence there is a marked customer preference for lighter oils. Thus there is an economic incentive for minimizing discoloration and degradation of hydrocarbon oils, especially during long-term storage.

SUMMARY OF THE INVENTION

An object of this invention is to prevent deterioration of hydrocarbon oils, as evidenced especially by sediment formation and discoloration, by the incorporation of minor amounts of a suitable additive is prepared by reacting poly(oxyalkylene)amine with an epihalohydrin at a temperature from about 40° C. to about 150° C., removing liberated halogen with an inorganic base, and recovering the reaction product. In another embodiment the additive comprises reacting poly(oxyalkylene)diamine with an epihalohydrin at said reaction conditions, removing liberated halogen with an inorganic base, and recovering the reaction product. In a more specific embodiment said epihalohydrin is epichlorohydrin.

DESCRIPTION OF THE INVENTION

Hydrocarbon oils are stored and utilized under a diversity of temperatures. Consequently it is desirable that additives have the attribute of ease of pumpability even at a low temperature. Among the physical attributes assuring facile pumping are a relatively low pour point and a suitable viscosity at low temperatures. A desirable attribute of additives which inhibit sedimentation is enhanced dispersant capability toward particulates but minimal dispersant capability toward water, for it is preferable to leave water as a separate phase in hydrocarbon oils. The reaction products of this invention have been discovered to act as superior sedimentation inhibitors while having low pour points, desirable viscosities, and low dispersability toward water. Additionally, the reaction products of this invention when used as additives to hydrocarbon oils effectively retard their discoloration. Because of their structure, other uses which may be anticipated for said reaction products include applications as antifoulants, carburetor detergents, lubricant additives, and corrosion inhibitors. Water-soluble reaction products may be effective scale control agents as well as corrosion inhibitors.

The additives of this invention are products of poly(oxyalkylene)amines with an epihalohydrin which have been reacted at a temperature from about 40° C. to about 150° C. in the presence of an inorganic base. Generally the reaction is conducted in a high-boiling aromatic solvent for ease of manipulation, examples of which include toluene, the xylenes, ethylbenzene, mesitylene, and other alkyl- and polyalkylbenzenes. However, a solvent may be dispensed with, although the results are not necessarily equivalent.

The poly(oxyalkylene)amines suitable for use in this invention include monoamines and diamines. Such amines may be regarded as the reaction products of a poly(oxyalkylene) glycol with ammonia, in which either both available hydroxyl groups are aminated to give diamines, or in which one available hydroxyl group is etherified and the other is aminated to give monoamines. Such poly(oxyalkylene) amines may be represented by the structure $A-(R_1O)_n-RNH_2$.

The moiety R of the polyoxyalkylene amines used in this invention is an alkylene group containing from 2 to about 10 carbon atoms. Examples of alkylene groups which are suitable include ethylene, propylene, butylene, amylene, hexylene, heptylene, octylene, nonylene, and decylene. Such alkylene groups may be linear or branched alkylene groups. Examples of branched alkylene groups which may be employed in this invention include isopropylene, sec-butylene, iso-butylene, sec-amylene, iso-amylene, etc. In one preferred embodiment R is an ethylene group, whereas in another preferred embodiment R is an isopropylene group.

The moieties $R_1$ may each be independently selected from the group consisting of alkylene groups containing from 2 to about 10 carbons, either linear or branched, and otherwise conforming to the description given above for the moiety R. The number of oxyalkylene moieties present, n, may vary from about 2 to about 50 or more. Each of the groups $R_1$ may be the same or different. In one embodiment all oxyalkylene groups are the same, i.e., each $R_1$ is identical. In another embodiment a chain of identical oxyalkylene moieties is flanked on one or both sides by one or more other oxyalkylene groups, to afford a partial structure which may be represented as:

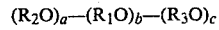

$(R_2O)_a-(R_1O)_b-(R_3O)_c$ where $a+b+c=n$, $R_2$ and $R_3$ are moieties of the same class as $R_1$, but where either $R_2$ or $R_3$, or both, are different from $R_1$ and may be different from each other.

Alkylene groups which are particularly preferred are ethylene and isopropylene groups.

The moiety A of the poly(oxyalkylene)amines used in the reaction of this invention may be the amino group, $H_2N$. In such an instance the poly(oxyalkylene)amine employed in this invention is a diamine which may result from the amination of both hydroxyl groups of a poly(oxyakylene) glycol.

The moiety A also may be an alkoxy group. The alkoxy group of said moiety A contains from about 1 to about 40 carbon atoms, but preferably from about 1 to about 20 carbon atoms. Suitable groups representative of the carbonaceous portion of the alkoxy group include methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, etc. Such groups may have their commercial origin in fatty acids and petroleum-derived alcohols, and consequently may be supplied as mixtures. Therefore it is to be understood that amines containing a combination of the aforementioned groups are explicitly within the scope of this invention.

When the carbonaceous portion of the alkoxy group is derived from fatty acids the major portion is an unbranched aliphatic group. When the carbonaceous portion comes from petroleum-derived olefins, the major portion generally is a branched aliphatic group. In each ease minor amounts of unsaturated material may be present. Therefore it is to be understood explicitly that the carbonaceous portion of the alkoxy group of the alkoxyalkylamines of this invention may be comprised of either a major portion of unbranched or branched aliphatic groups which may contain minor amounts of unsaturation.

The moiety A also may be derived from trimethylolpropane. In such an instance A may be represented as:

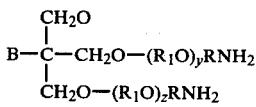

where R and $R_1$ conform to the description given them previously, and y, z are integers from 1 to about 10. The moiety B may be hydrogen or an alkyl group containing from 1 to about 10 carbon atoms.

The amine or mixture of amines is reacted with an epihalohydrin. Epichlorohydrin is preferred, although epibromohydrin and epiiodohydrin may be used but not necessarily with equivalent results in every case. Other epihalohydrins which may be employed in this invention include 1-chloro-3,4-epoxybutane, 1-chloro-2,3-epoxybutane, 1-chloro-4,5-epoxypentane, etc., and the corresponding bromo and iodo compounds. Suitable condensation products may also be obtained when using a mixture of epihalohydrins, where each of the components meet the qualifications set forth above. The amount of epihalohydrin used ranges from about 0.5 to about 2 moles per mole of amine.

The preparation of the reaction products of this invention is effected by contacting the epihalohydrin and amine, generally in a high boiling aromatic solvent, at a suitable temperature, then removing formed inorganic chloride with an inorganic base. Generally the reaction may be conducted at a temperature from about 40° C. to about 150° C. A preferred temperature range is from about 60° C. to about 125° C. Inorganic bases suitable for use include the alkali metal hydroxides and carbonates, the alkaline earth oxides, hydroxides, and carbonates. Examples of such materials, cited for illustrative purposes only, are the hydroxides and carbonates of lithium, sodium, potassium, rubidium and cesium, magnesium oxide, magnesium hydroxide, magnesium carbonate, calcium oxide, calcium hydroxide, calcium carbonate, barium oxide, barium hydroxide, and barium carbonate. Where the epihalohydrin is used in up to equal molar porportions of the amine, then the molar amount of base employed is approximately equal to that of the amine, although a small excess of base over amine up to about 50% often may be employed advantageously. Where the epihalohydrin is used in greater than molar proportions relative to amine, then the molar amount of base is about equal to that of the epihalohydrin, although a small excess of up to about 50% may be used.

The mode of preparation of the condensation products of this invention is susceptible to numerous variations on the theme of reacting the amine with the epihalohydrin under reaction conditions. An example of one general mode is the addition of epihalohydrin to a solution of the amine in a suitable solvent, generally a high-boiling aromatic compound or mixtures thereof. Reaction between the components occurs to a given acidity, or given amount of amine hydrochloride formation, at which time either aqueous or solid base is added to remove the inorganic halide thus formed. The primary reaction product therefrom undergoes further condensation leading to the ultimate reaction product.

An example of another mode of preparation is the concurrent addition of epihalohydrin and amine to the solvent employed at a suitable temperature. When the reaction has occurred to a desired amount of acidity, aqueous or solid base is added and the primary reaction product thereupon undergoes further condensation leading to the ultimate reaction product.

In still another method of preparation, the epihalohydrin and amine are added concurrently to the solvent containing a portion of the base employed. The base may be either in solution or as a solid. After reaction has occurred to a given amount of acidity the remaining portion of solid or aqueous base is added and the primary reaction product thereupon undergoes further condensation leading to the ultimate reaction product.

The reaction products of this invention may be used as additives for many kinds of hydrocarbon oils. These additives are especially advantageous when used with fuel oils. Examples of such fuel oils include gasoline, diesel fuel, jet fuel, other aviation fuel, burner oil, furnace oil, kerosene, and naphtha. Examples of other oils in which the reaction products of this invention may be employed includes lubricating oils, cutting oils, slushing oils, etc. Said additives may be employed in a concentration from about 0.0001% to about 1% by weight, depending upon the nature of the hydrocarbon oil, its source, its intended use, its history, etc.

The following examples are merely illustrative of this invention, and it is to be understood that the invention is not necessarily limited thereto.

EXAMPLE 1

The amine used was a methoxy poly(isopropylenoxy)isopropylene amine, of approximate formula $CH_3O—(CH_2CH(CH_3)O)_9—CH_2CH(CH_3)NH_2$, and supplied by Jefferson Chemical Co., Inc. as Jeffamine M-600. Epichlorohydrin (9.2 g., 0.10 mol) was added dropwise over one minute to a pale yellow solution of amine at 75° C. in 60 g. Espesol 3BC (high boiling bottoms from xylene fractionation as supplied by Charter Oil Company) and 2-propanol (20 g). The resulting solution was stirred at 75°–78.5° C. for 1 hour 47 minutes, giving a solution with an acidity of 14% of the theoretical maximum. The temperature was raised to 86° C. and kept there 1 hour 5 minutes, giving a solution with an acidity of 28%. Then 17% aqueous sodium hydroxide solution (25.8 g, 0.110 mol, 10% excess) was added in one portion. The mixture was stirred at 84° C. for 1 hour 10 minutes. The layers were separated. The organic layer was azeotropically distilled with collection of the 2-propanol-water azeotrope. The solution was cooled and suction-filtered, giving a light yellow solution (114.6 g, 92%, 52.7 wt% active-ingredient).

EXAMPLE 2

The amine used was of the structure $H_2NCH(CH_3)CH_2-(OCH(CH_3)CH_2-)_a(OCH_2CH_2-)_b(OCH_2CH(CH_3)-)_cNH_2$, of approximate molecular weight 600, where b is 13–14, and a+c is 3–4. Epichlorohydrin (18.5 g, 0.200 mol) was added dropwise over 6 minutes to a stirred yellow light solution of such amine (60.0 g, 0.200 eq, 0.100 mol) in Espesol 3BC, (70.0 g) and 2-propanol (25.0 g) at 59°–60° C. The temperature was kept at 59°–60° C. for one hour. The temperature was raised over 10 minutes and held at 78.5°–80° C. for two hours, 9 minutes, giving a solution with an acidity 29% of the theoretical maximum. Then 17% aqueous sodium hydroxide (49.4 g, 0.200 mol, 10% excess) was added over 2 minutes to the stirred solution. The temperature was raised from 71° C. to 79° C. over 40 minutes and kept at 79°–79.5° C. for 30 minutes. The layers were separated, giving a light yellow cloudy organic layer containing water droplets. The resulting solution was dried by azeotropic distillation with 2-propanol (10.0 g.) The resulting solution was filtered, giving a clear, light yellow solution (131.3 g, 90%, 54.2 wt% active-ingredient by nitrogen-jet gum method, ANSI/ASTH D 381-70 modified in that nitrogen is used as the gas).

EXAMPLE 3

The amine was the diaminated product of poly(isopropyleneoxy) glycol, approximate molecular weight 230, containing 3–4 isopropylene units. Epichlorohydrin (17.6 g, 0.19 mol) was added dropwise over 21 minutes to a stirred, almost colorless solution of the amine (46.8 g, 0.20 mol) in Espesol 3BC, (45.0 g) at 75.5°–78.5° C. The temperature was kept at 78.5°–80.5° C. for 14 minutes, raised from 80.5° C. to 86° C. over 9 minutes, and kept at 86°–88° C. over 39 minutes after which an aliquot had an acidity 37% of the maximum theoretical. Then 20% aqueous sodium hydroxide (42.0 g, 0.21 mol, 10% excess) was added to the stirred solution at 84°–87° C. over 38 minutes. The resulting mixture was stirred at 85°–90.5° C. for 2 hours 7 minutes. Then more 20% aqueous sodium hydroxide (3.8 g, 0.019 mol, total 20% excess) was added to the mixture at 90° C. The mixture was stirred at 90°–91° C. for 31 minutes. The layers were separated. The organic layer was dried by azeotropic distillation with 2-propanol and suction-filtered, giving a clear, pale yellow filtrate (87.8 g, 86%, 45.6 wt% active ingredient by nitrogen-jet gum method).

EXAMPLE 4

The amine was of the same structural type as used in the prior example but with the somewhat higher molecular weight of about 400. Epichlorohydrin (8.3 g, 0.90 mol) was added dropwise over 8 minutes to a stirred, very pale yellow solution of the amine (41.0 g, 0.200 eq, 0.100 mol) in Espesol 3BC, (40.0 g) at 75°–75.5° C. The resulting solution was stirred at 75.5°–76° C. for 56 minutes. The temperature was increased in 2 steps from 75.5° C. to 93° C. over 56 minutes and kept at 93° C. for 6 minutes after which an aliquot had an acidity 32% of the maximum theoretical. Then 20% aqueous sodium hydroxide (19.8 g, 0.099 mol, 10% excess) was added dropwise over 6 minutes to the stirred solution at 93°–88° C. The mixture was stirred at 88°–93° C. for 17 minutes and 93°–94° C. for one hour 10 minutes with some white salt settling to the bottom. Then additional 20% aqueous sodium hydroxide (1.8 g, 0.0090 mol, total excess 20%) was added. The resulting mixture was stirred at 91° C. for 50 minutes. The layers were separated, giving a pale yellow organic layer containing some suspended water. The solution was dried by azeotropic distillation with 2-propanol (20.1 g). The resulting solution was suction-filtered giving a light yellow solution (65.9 g, 77%, 53.1 wt% active-ingredient by nitrogen-jet gum method).

EXAMPLE 5

In this example the amine was a substituted ether of trimethylolpropane of the type:

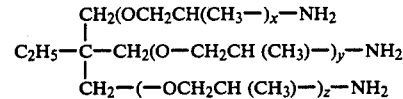

where x+y+z had an average value of about 5.3. Epichlorohydrin (8.7 g, 0.094 mol) was added dropwise over 12 minutes to a stirred, pale yellow solution of said amine (44.1 g, 0.30 eq, 0.10 mol) in Espesol 3BC, (47.0 g) at 75°–77° C. The resulting solution was stirred at 77°–78° C. for 14 minutes. The temperature was increased stepwise from 77.5° C. to 94° C. over 45 minutes and maintained there for 13 minutes to an acidity of 44% of the maximum theoretical. Then 20% aqueous sodium hydroxide (21.0 g, 0.105 mol, 10% excess) was added dropwise over 13 minutes to the stirred solution at 94.5°–90° C. The mixture was filtered and the layers were separated. The organic layer was filtered, giving a clear yellow pale filtrate (87.4 g, 96%, 46.1 wt% active-ingredient by nitrogen-jet gum method).

EXAMPLE 6

In this example are collected several representative products prepared from epichlorohydrin in this invention. All reaction products were used at a concentration of 17 ppm in the same fuel oil. Their efficacy in inhibiting sedimentation and discoloration was determined by an accelerated storage stability test conducted as follows: One liter of fuel oil is poured into a flask containing four sandblasted steel strips. Oxygen is blown into the flask for 5 minutes and the flask is stoppered securely, then heated at 212° F. for 16 hours. The flask is cooled for one hour and the oil is filtered through a weighed 0.8 micron millipore filter disc, the color of the filtrate being measured. The flask and steel strips are washed with a solvent, such as isooctane, the washings are filtered through the same filter disc, and the filter disc and material collected thereon are washed with a separate portion of solvent. The disc is then heated at 95° C. to remove solvent, after which the disc is cooled and its weight taken to determine the weight of the sediment thereon.

The change in color is determined from the absorbance of the sample before and after heating. Material which tends to prevent discoloration will show a smaller change in absorbance than a blank sample, i.e., one in which the fuel oil has no additives. The efficiency of the reaction products of this invention in preventing discoloration was determined, at the same weight-weight concentration, relative to Polyflo ® 130, a commercial product of UOP, Inc., by comparing the difference between the absorbance of the blank, $A_{blank}$, and that containing the reaction products of this invention, A, with that of the standard, $A_{130}$, using the formula:

relative efficiency = $A_{blank}$-A/$A_{blank}$-$A_{130}$

Values greater than one show the material is superior to the standard in retarding discoloration.

The weight of sediment observed in the presence of various additive materials is a direct measure of their inhibitory tendencies toward sediment formation. A comparison of the efficacy of the materials of this invention with that of the successful commercial product Polyflo ® 130 is the ratio of weight of sediment formed in the presence of Polyflo ® to the weight formed in the presence of the materials of this invention at the same weight-weight concentration.

| Physical Properties and Inhibitor Efficiency of Additives | | | |
|---|---|---|---|
| Amine | Ratio Epichlorohydrin to Amine | Sedimentation Inhibition | Discoloration |
| See Example 5 | 0.93 | 0.8 | 0.7 |
| See Example 4 | 0.90 | 0.6 | 0.8 |
| See Example 3 | 0.95 | 1.1 | 1.5 |

As the data on this Table show, the additives of this invention are of comparable or superior efficiency relative to a commercial standard in inhibiting sedimentation and discoloration in a typical fuel oil.

What is claimed is:

1. A composition comprising a major amount of a hydrocarbon oil containing from about 0.0001% to about 1% of the reaction product of 1 molar proportion of a poly(oxyalkylene)amine, A—($R_1O$)$_n$—$RNH_2$, wherein
   a. R is an alkylene moiety containing from 2 to about 10 carbon atoms;
   b. $R_1$ is independently selected from the group consisting of alkylene moieties containing from 2 to about 10 carbon atoms;
   c. n is an integer from about 2 to about 50;
   d. A is selected from the group consisting of $H_2N$, alkoxy, where the carbonaceous portion contains from 1 to about 40 carbon atoms, and

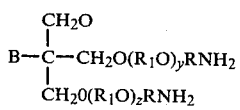

wherein B is selected from the group consisting of hydrogen and alkyl containing from about 1 to about 10 carbon atoms, and y, z, are integers from 1 to about 10;

with about 0.5 to about 2.0 molar proportion of an epihalohydrin selected from the group consisting of epihalohydrin, 1-halo-3,4-epoxybutane, 1-halo-2,3-epoxybutane, 1-halo-4,5-epoxypentane and 1-halo-3,4-epoxypentane, at a temperature from about 40° C. to about 150° C. in the presence of an inorganic base.

2. The composition of claim 1 wherein said hydrocarbon oil is a fuel oil.

3. The composition of claim 2 wherein said fuel oil is selected from the group consisting of gasoline, diesel fuel, jet fuel, aviation fuel, burner oil, furnace oil, kerosene, and naphtha.

4. The composition of claim 1 wherein said epihalohydrin is epichlorohydrin.

5. The composition of claim 4 wherein said R moiety is selected from the group consisting of ethylene and isopropylene moieties.

6. The composition of claim 4 wherein $R_1$ is selected from the group consisting of ethylene and isopropylene moieties.

7. The composition of claim 4 wherein A is selected from the group consisting of $H_2N$ and alkoxy where the carbonaceous portion contains from 1 to about 20 carbon atoms.

8. A method of inhibiting sedimentation and discoloration of hydrocarbon oils comprising dissolving therein an amount from about 0.0001% to about 1% of the reaction product of 1 molar proportion of a poly(oxyalkylene)amine, A—($R_1O$)$_n$—$RNH_2$, wherein
   a. R is an alkylene moiety containing from 2 to about 10 carbon atoms;
   b. $R_1$ is independently selected from the group consisting of alkylene moieties containing from 2 to about 10 carbon atoms;
   c. n is an integer from about 2 to about 50;
   d. A is selected from the group consisting of $H_2N$, alkoxy, wherein the carbonaceous portion contains from 1 to about 40 carbon atoms, and

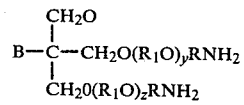

wherein B is selected from the group consisting of hydrogen and alkyl containing from 1 to about 10 carbon atoms, and y, z are integers from 1 to about 10; with about 0.5 to about 2.0 molar proportion of an epihalohydrin selected from the group consisting of epihalohydrin, 1-halo-3,4-epoxybutane, 1-halo-2,3-epoxybutane, 1-halo-4,5-epoxypentane, 1,2-epi-5-halopentane and 1-halo-3,4-epoxypentane at a temperature from about 40° C. to about 150° C. in the presence of an inorganic base.

9. The method of claim 8 wherein said epihalohydrin is epichlorohydrin.

10. The method of claim 9 wherein the reaction product is formed at a temperature of about 60° C. to about 125° C.

11. The method of claim 9 wherein said hydrocarbon oil is a fuel oil selected from the group consisting of gasoline, diesel fuel, jet fuel, aviation fuel, burner oil, furnace oil, kerosene and naphtha.

12. The method of claim 9 wherein said R and $R_1$ moieties are selected from the group consisting of ethylene and isopropylene moieties.

13. The method of claim 12 wherein A is selected from the group consisting of $H_2N$ and alkoxy where the carbonaceous portion contains from 1 to about 20 carbon atoms.

* * * * *